US010364349B1

(12) United States Patent
Bertelo et al.

(10) Patent No.: US 10,364,349 B1
(45) Date of Patent: *Jul. 30, 2019

(54) ASSEMBLIES CONTAINING POLYETHERKETONEKETONE TIE LAYERS

(71) Applicant: Arkema Inc., King of Prussia, PA (US)

(72) Inventors: Christopher A. Bertelo, Doylestown, PA (US); Gregory S. O'Brien, Downingtown, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/599,597

(22) Filed: May 19, 2017

Related U.S. Application Data

(63) Continuation of application No. 13/148,170, filed as application No. PCT/US2010/023131 on Feb. 4, 2010, now Pat. No. 9,683,100.

(Continued)

(51) Int. Cl.
*B32B 7/14* (2006.01)
*B32B 17/06* (2006.01)
(Continued)

(52) U.S. Cl.
CPC ............ *C08L 71/00* (2013.01); *B32B 5/02* (2013.01); *B32B 7/14* (2013.01); *B32B 9/005* (2013.01); *B32B 9/045* (2013.01); *B32B 15/08* (2013.01); *B32B 15/20* (2013.01); *B32B 17/06* (2013.01); *B32B 27/08* (2013.01); *B32B 27/12* (2013.01); *B32B 27/18* (2013.01); *B32B 27/281* (2013.01); *B32B 27/285* (2013.01); *B32B 27/286* (2013.01); *B32B 27/288* (2013.01); *B32B 27/34* (2013.01); *B32B 27/36* (2013.01); *B32B 27/365* (2013.01); *C09J 171/00* (2013.01); *B32B 2255/26* (2013.01); *B32B 2262/101* (2013.01); *B32B 2307/50* (2013.01); *B32B 2307/54* (2013.01); *B32B 2307/702* (2013.01); *B32B 2307/704* (2013.01); *B32B 2405/00* (2013.01); *B32B 2419/00* (2013.01); *B32B 2439/00* (2013.01); *B32B 2535/00* (2013.01); *B32B 2597/00* (2013.01); *B32B 2605/00* (2013.01); *C08G 2650/40* (2013.01); *Y10T 428/26* (2015.01); *Y10T 428/31645* (2015.04);
(Continued)

(58) Field of Classification Search
CPC .......... B32B 7/14; C09J 161/16; C09J 171/00
See application file for complete search history.

(56) References Cited

U.S. PATENT DOCUMENTS 3,065,205 A 11/1962 Bonner et al.
3,441,538 A 4/1969 Marks et al.
(Continued)

FOREIGN PATENT DOCUMENTS

JP 2003082124 A 3/2003
WO WO 91/07272 5/1991
(Continued)

OTHER PUBLICATIONS

International Search Report for International Application No. PCT/US/10/021102 dated Mar. 31, 2010.
(Continued)

*Primary Examiner* — Ramsey Zacharia
(74) *Attorney, Agent, or Firm* — Lynn B. Morreale

(57) ABSTRACT

Tie layers comprised of amorphous polyetherketoneketone are used to join substrates to form laminates and other assemblies.

8 Claims, 1 Drawing Sheet

Related U.S. Application Data

(60) Provisional application No. 61/150,128, filed on Feb. 5, 2009.

(51) Int. Cl.

| | | |
|---|---|---|
| *B32B 27/06* | (2006.01) | |
| *C08L 71/00* | (2006.01) | |
| *C09J 171/00* | (2006.01) | |
| *B32B 27/28* | (2006.01) | |
| *B32B 27/36* | (2006.01) | |
| *B32B 5/02* | (2006.01) | |
| *B32B 9/00* | (2006.01) | |
| *B32B 9/04* | (2006.01) | |
| *B32B 15/08* | (2006.01) | |
| *B32B 15/20* | (2006.01) | |
| *B32B 27/08* | (2006.01) | |
| *B32B 27/12* | (2006.01) | |
| *B32B 27/18* | (2006.01) | |
| *B32B 27/34* | (2006.01) | |

(52) U.S. Cl.
CPC ............ *Y10T 428/31692* (2015.04); *Y10T 428/31855* (2015.04)

(56) References Cited

U.S. PATENT DOCUMENTS

| | | | |
|---|---|---|---|
| 3,442,857 A | 5/1969 | Thornton | |
| 3,514,966 A | 6/1970 | Berr | |
| 3,519,206 A | 7/1970 | Leaders | |
| 3,666,612 A | 5/1972 | Angelo | |
| 3,778,535 A | 12/1973 | Forney, Jr. | |
| 3,824,686 A | 7/1974 | Forney, Jr. | |
| 3,929,164 A | 12/1975 | Richter | |
| 4,359,501 A | 11/1982 | DiTullio | |
| 4,704,448 A | 11/1987 | Brugel | |
| 4,747,988 A | 5/1988 | Deeg | |
| 4,765,860 A | 8/1988 | Ueno ............... | B32B 38/0008 156/272.6 |
| 4,816,556 A | 3/1989 | Gay et al. | |
| 4,820,571 A | 4/1989 | Searfass | |
| 4,891,084 A | 1/1990 | Senior | |
| 4,954,605 A | 9/1990 | Deeg | |
| 4,992,323 A | 2/1991 | Vogelesang et al. | |
| 4,992,485 A | 2/1991 | Koo et al. | |
| 4,996,287 A | 2/1991 | Bloom | |
| 5,034,157 A | 7/1991 | Merrell et al. | |
| 5,049,340 A | 9/1991 | Moss et al. | |
| 5,124,413 A | 6/1992 | Luise | |
| 5,130,408 A | 7/1992 | Deeg | |
| 5,238,725 A | 8/1993 | Effing et al. | |
| 5,260,104 A | 11/1993 | Bryant et al. | |
| 5,290,906 A | 3/1994 | Matsumura et al. | |
| 5,300,122 A | 4/1994 | Rodini | |
| 5,304,413 A | 4/1994 | Bloom et al. | |
| 5,328,744 A | 7/1994 | Kaufmann et al. | |
| 5,407,516 A | 4/1995 | Kaufmann et al. | |
| 5,409,757 A | 4/1995 | Muzzy et al. | |
| 5,470,639 A | 11/1995 | Gessner et al. | |
| 5,484,500 A | 1/1996 | Kaufmann et al. | |
| 5,589,249 A | 12/1996 | Bodford et al. ............. | 428/200 |
| 5,601,893 A | 2/1997 | Strassel et al. | |
| 5,667,146 A | 9/1997 | Pimentel et al. | |
| 5,730,188 A | 3/1998 | Kalman et al. | |
| 5,780,142 A | 7/1998 | Kume ................. | B44C 1/165 428/195.1 |
| 5,997,989 A | 12/1999 | Gessner et al. | |
| 6,004,160 A | 12/1999 | Korsunsky et al. | |
| 6,132,872 A | 10/2000 | McIntosh et al. | |
| 6,177,518 B1 | 1/2001 | Lahljani | |
| 6,383,623 B1 | 5/2002 | Erb, Jr. | |
| 6,668,866 B2 | 12/2003 | Glejbol et al. | |
| 6,773,773 B2 | 8/2004 | Hauber | |
| 6,857,452 B2 | 2/2005 | Quigley et al. | |
| 6,978,806 B2 | 12/2005 | Glejbol et al. | |
| 7,055,551 B2 | 6/2006 | Fraser et al. | |
| 7,302,973 B2 | 12/2007 | Glejbol et al. | |
| 7,335,276 B2 | 2/2008 | Kawka et al. | |
| 7,750,091 B2 | 7/2010 | Maljkovic et al. | |
| 7,820,767 B2 | 10/2010 | El-Hibri et al. | |
| 7,867,621 B2 | 1/2011 | Rawlings et al. | |
| 7,875,696 B2 | 1/2011 | Myrick et al. | |
| 8,048,966 B2 | 11/2011 | Myrick et al. | |
| 8,240,252 B2 | 8/2012 | Maljkovic et al. | |
| 2003/0032339 A1 | 2/2003 | Bell et al. | |
| 2003/0047317 A1 | 3/2003 | Powers | |
| 2004/0060655 A1 | 4/2004 | Kawka et al. | |
| 2005/0000183 A1 | 1/2005 | Fay et al. ................. | 52/506.01 |
| 2005/0089704 A1 | 4/2005 | Rajabali et al. ............. | 428/544 |
| 2005/0181203 A1 | 8/2005 | Rawlings et al. | |
| 2006/0068613 A1 | 3/2006 | Tsukada et al. ................. | 439/67 |
| 2007/0036925 A1 | 2/2007 | Braad | |
| 2007/0066741 A1 | 3/2007 | Donovan et al. | |
| 2007/0106006 A1 | 5/2007 | Cooper et al. | |
| 2007/0142569 A1 | 6/2007 | Donovan et al. | |
| 2007/0148457 A1 | 6/2007 | Wagner et al. | |
| 2007/0212963 A1 | 9/2007 | Keep | |
| 2007/0243762 A1 | 10/2007 | Burke | |
| 2007/0246248 A1 | 10/2007 | Ueda et al. .................... | 174/256 |
| 2008/0009903 A1 | 1/2008 | Schmieding et al. | |
| 2008/0063847 A1 | 3/2008 | Chang et al. | |
| 2008/0139065 A1 | 6/2008 | Amarasekera et al. | |
| 2008/0190507 A1 | 8/2008 | Hardy | |
| 2008/0220212 A1 | 9/2008 | Lin et al. ...................... | 428/138 |
| 2008/0248201 A1 | 10/2008 | Corkey et al. | |
| 2008/0255647 A1 | 10/2008 | Jensen et al. | |
| 2008/0312387 A1 | 12/2008 | El-Hibri et al. | |

FOREIGN PATENT DOCUMENTS

| | | |
|---|---|---|
| WO | WO2005084937 | 9/2005 |
| WO | WO 2008/113362 | 9/2008 |
| WO | WO 2008/119677 | 10/2008 |
| WO | WO 2010/085419 | 7/2010 |
| WO | WO 2010/088638 | 8/2010 |
| WO | WO 2010/088639 | 8/2010 |
| WO | WO 2010/091135 | 8/2010 |
| WO | WO 2010/107976 | 9/2010 |
| WO | WO 2010/111335 | 9/2010 |

OTHER PUBLICATIONS

International Search Report for International Application No. PCT/US/10/022796 dated Mar. 5, 2010.
International Search Report for International Application No. PCT/US/10/022797 dated Feb. 25, 2010.
International Search Report for International Application No. PCT/US/10/023131 dated Mar. 15, 2010.
International Search Report for International Application No. PCT/US/10/023129 dated Mar. 15, 2010.
International Search Report for International Application No. PCT/US/10/027754 dated May 4, 2010.
International Search Report for International Application No. PCT/US/10/028417 dated May 11, 2010.
International Preliminary Report on Patentability for International Application No. PCT/US2010/023131 dated Aug. 9 2011.
Dictionary.com—layer. Retrieved on Mar. 31, 2016. http://www.dictionary.com/browse/layer.
Muzzy, Thermoplastics—Properties. Retrieved on Aug. 1, 2013. http://www-old.me.gatech.edu/jonathan.colton/me4793/thermoplastchap.pdf.
Thesaurus.com—bind. Retrieved on Sep. 13, 2012.http://thesaurus.com/browse/bind?s=t.
Arkerna, General Presentation, PEKK Powder Coatings. Jan. 17, 2011.

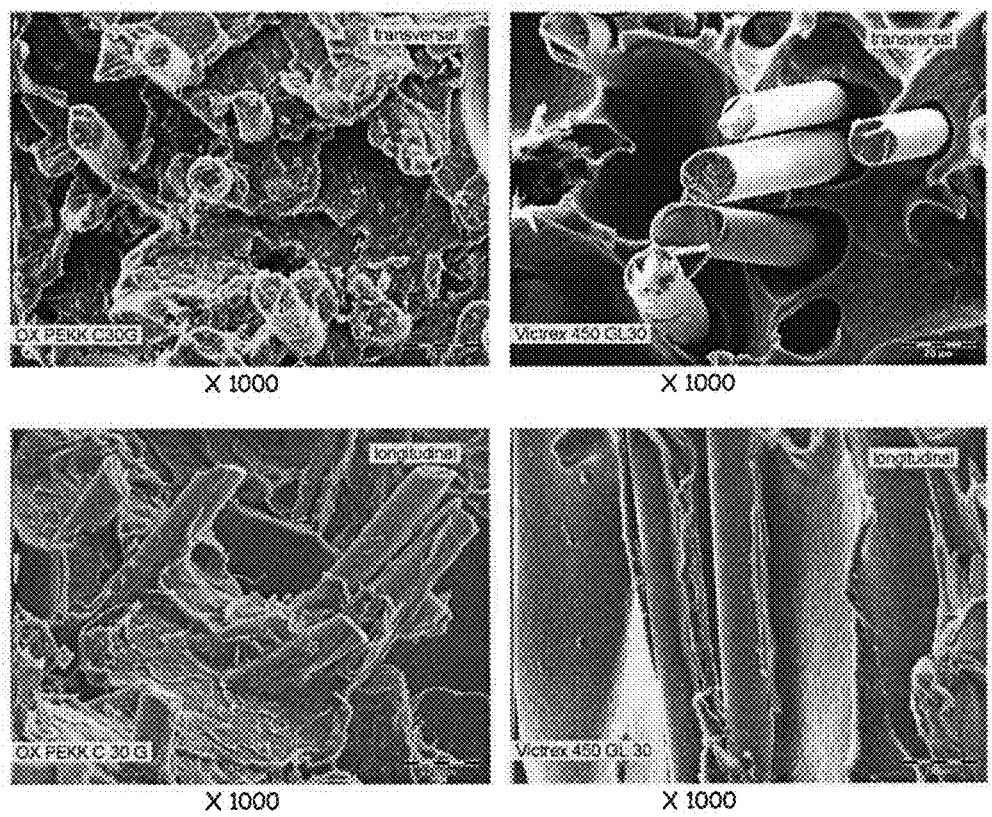

ASSEMBLIES CONTAINING POLYETHERKETONEKETONE TIE LAYERS

CROSS-REFERENCE TO RELATED APPLICATIONS

This application is a continuation of U.S. application Ser. No. 13/148,170, filed Aug. 16, 2011 which is a national stage application under 35 U.S.C. § 371 of PCT/US2010/023131, filed Feb. 4, 2010, which claims benefit to U.S. Provisional Application No. 61/150,128, filed on Feb. 5, 2009.

FIELD OF THE INVENTION

The invention relates to the use of amorphous polyetherketoneketones as tie layers in assemblies such as composites, laminates, and the like.

DISCUSSION OF THE RELATED ART

In recent decades, considerable development effort has been invested in the design of laminates, composites and other assemblies comprising multiple layers of different materials. For many end-use applications, it is not feasible to use a single material to fabricate a desired component due to particular multiple performance requirements that cannot be met by any known material. For example, a part may need to be simultaneously high in strength and stiffness as well as pressure resistant, solvent/chemical resistant, and dimensionally stable at high temperatures. However, it has often proven to be challenging to achieve satisfactory adhesion or bonding directly between the dissimilar layers that may need to be utilized in a composite or laminate. Poor compatibility between composite layers can limit the properties exhibited by such assemblies. In particular, certain thermoplastics (particularly crystalline and/or high temperature thermoplastics) exhibit poor adhesion to other materials, which has been attributed to the inability of such thermoplastics to adequately "wet" surfaces of dissimilar substances, leading to problems with delamination and loss of structural integrity when the composite is placed in use in a highly demanding environment. Accordingly, it would be advantageous to develop improved methods of assembling composites, laminates and the like which avoid such difficulties by ensuring good bonding between the composite or laminate layers.

BRIEF SUMMARY OF THE INVENTION

An assembly is provided by the present invention which is comprised of a first substrate and a second substrate, wherein a tie layer comprised of amorphous polyetherketoneketone is positioned between and in contact with said first substrate and said second substrate. Such assemblies may be prepared by coating one substrate with amorphous polyetherketoneketone and then joining the other substrate with the coated substrate by pressing the substrates together while heating the polyetherketoneketone tie layer. Alternatively, a coextrusion process can be utilized. The invention is especially useful where one substrate is comprised of a crystalline and/or high temperature thermoplastic such as a crystalline poly(aryletherketone) that does not exhibit completely satisfactory adhesion to the surface of the other substrate in the absence of the tie layer.

BRIEF DESCRIPTION OF THE DRAWINGS

FIG. 1 Shows micrographs of fibers sized with PEKK and PEEK, and demonstrates the failure mode in fibers of each sizing.

DETAILED DESCRIPTION OF CERTAIN EMBODIMENTS OF THE INVENTION

Assemblies in accordance with the present invention are advantageously manufactured using tie layers comprised of amorphous polyetherketoneketone. The amorphous polyetherketoneketones suitable for use in the present invention comprise (and preferably consist essentially of or consist of) repeating units represented by the following formulas I and II:

where A is a p,p'-Ph-O-Ph- group, Ph is a phenylene radical, B is p-phenylene, and D is m-phenylene. The Formula I:Formula II (T:I) isomer ratio in the polyetherketoneketone is varied so as to provide an amorphous (non-crystalline) polymer. An amorphous polymer, for purposes of this invention, means a polymer that does not exhibit a crystalline melting point by differential scanning calorimetry (DSC).

Polyetherketoneketones are well-known in the art and can be prepared using any suitable polymerization technique, including the methods described in the following patents, each of which is incorporated herein by reference in its entirety for all purposes: U.S. Pat. Nos. 3,065,205; 3,441,538; 3,442,857; 3,516,966; 4,704,448; 4,816,556; and 6,177,518. Mixtures of polyetherketoneketones may be employed.

In particular, the Formula I:Formula II ratio (sometimes referred to in the art as the T/I ratio) can be adjusted as desired by varying the relative amounts of the different monomers used to prepare the polyetherketoneketone. For example, a polyetherketoneketone may be synthesizing by reacting a mixture of terephthaloyl chloride and isophthaloyl chloride with diphenyl ether. Increasing the amount of terephthaloyl chloride relative to the amount of isophthaloyl chloride will increase the Formula I:Formula II (T/I) ratio. Generally speaking, a polyetherketoneketone having a relatively high Formula I:Formula II ratio will be more crystalline than a polyetherketoneketone having a lower Formula I:Formula II ratio. An amorphous polyetherketoneketone having a T/I ratio of from about 55:45 to about 65:35 is particularly suitable for use in the present invention.

Suitable amorphous polyetherketoneketones are available from commercial sources, such as, for example, certain of the polyetherketoneketones sold under the brand name OXPEKK by Oxford Performance Materials, Enfield, Conn., including OXPEKK-SP polyetherketoneketone.

The polymeric composition used to form the tie layer may additionally be comprised of components other than the amorphous polyetherketoneketone, such as stabilizers, pigments, processing aids, fillers, and the like. In certain embodiments of the invention, the polymeric composition consists essentially of or consists of amorphous polyetherketoneketone. For example, the polymeric composition may be free or essentially free of any type of polymer other than amorphous polyetherketoneketone.

The present invention is useful for multilayer structures, such as, for example, films, sheets, pipes and hollow bodies, such as storage tanks, wherein a tie layer comprised of amorphous polyetherketoneketone is used to adhere a first substrate layer to a second substrate layer. The multilayer structure thus may comprise a tie layer (T), a first substrate layer (S1) directly attached to a first face (surface) of tie layer (T), and a second substrate layer (S2) directly attached to a second face (surface) of tic layer (T), such that the tie layer (T) is sandwiched between first substrate layer (S1) and second substrate layer (S2). Of course, additional layers and components may be present in the assembly, including one or more further tie layers positioned between other substrate layers.

One or both of the substrate layers joined by the tie layer can, for example, be a sheet or a thin film. The substrates may be comprised of any suitable material such as, for example, metal, plastic (thermoplastic or thermoset), ceramic, or glass. The substrate may be a composite material such as, for example, glass fiber-reinforced plastic. The thickness of the thin film or of the sheet can be suitably chosen and can be, for example, from approximately 0.01 to approximately 10 mm.

In one embodiment, at least one of either the first substrate or the second substrate is comprised of a crystalline (including semi-crystalline) and/or high temperature thermoplastic as these materials often exhibit interfacial adhesion to various types of substrate surfaces that is not completely satisfactory. A tie layer of amorphous polyetherketoneketone in accordance with the present invention helps to improve such adhesion, thereby enhancing the mechanical and other properties of the resulting assembly. Suitable crystalline and/or high temperature thermoplastics include, but are not limited to, polyaryletherketones (such as crystalline polyetherketone (PEK), crystalline polyetheretherketone (PEEK), crystalline polyetherketoneketone (PEKK), polyetheretheretherketone (PEEEK), polyetheretherketoneketone (PEEKK), polyetherketoneetheretherketone (PEKEEK), and polyetherketoneketoneketone (PEKKK)), polyimides, polyetherimides, polyamideimides, polysulfones, polyethersulfones, polyarylethers, polycarbonates, liquid crystal polymers, polyphenylene sulfides, polyarylenes (polyphenylenes), polyamides, polyphthalamides, polyaromatic esters and the like.

In another embodiment, at least one of either the first substrate or the second substrate is metallic, e.g., a metal sheet, foil, or the like. The substrate may be comprised of any suitable metal or metal alloy such as steel, aluminum, aluminum alloy, copper, gold, silver or the like.

The tie layer typically is relatively thin, e.g., from about 1 to about 100 microns thick. In one embodiment of the invention, the interface between the first and second substrate surfaces is completely filled or covered by the tie layer, although in other embodiments the tie layer may be discontinuous.

In one embodiment, the assemblies of the invention are manufactured by adapting known coextrusion processes, particularly where both of the substrate layers joined by the tie layer are based on thermoplastic polymers. For example, the apparatus used for making such assemblies can be any conventional or standard extruder, dies or stream distributors generally employed for the coextrusion of thermoplastic polymers. The thickness of each of the polymeric layers will depend on the regulation of the flow rate of each of the extruders. Generally, the die and extruder temperatures should be selected based on the characteristics and properties of the polymers to be used in the tie layer and the substrate layers so that the materials are rendered capable of being extruded.

The assemblies of the invention can be extruded into any conventional form, including film, plate, sheeting, tubing or any other shape conventionally obtainable by coextrusion.

Compression molding, intermittent matched die consolidation, double belt press consolidation, composite roll forming, transfer molding, as well as other such techniques can also be utilized in connection with the present invention. For example, the assembly may be prepared by placing a sheet or film corresponding in composition to the desired tie layer between a first substrate and a second substrate and heating the resulting "sandwich" at a temperature effective to soften at least one of the layers sufficiently to enable it to flow and come into intimate contact with an adjacent layer, thereby forming an adhesive bond when the assembly is cooled. Typically, it will be desirable to apply pressure on the "sandwich" so as to enhance the degree of adhesion achieved between the tie layer and the substrate layers. Thermoforming of the assembly can be carried out so as to attain a particular desired shape or contour.

In yet another embodiment, the assembly may be formed by first adhering a tie layer in accordance with the present invention to a first substrate. This may, for example, be accomplished by coextrusion of the tie layer and the first substrate or by pressing a sheet of the tie layer and a sheet of the first substrate together while heating or by extruding the tie layer onto the first substrate. The resulting tie layer/first substrate subassembly can then be joined to a second substrate by bringing the second substrate into contact with the other side of the tie layer, with sufficient heat and pressure being applied so as to create the desired degree of adhesion between the tie layer and the surface of the second substrate. Overmolding or extrusion molding techniques could also be utilized. For example, the tie layer/first substrate subassembly can be positioned in a mold and a heated polymeric composition (corresponding to the composition of the desired second substrate) introduced into the mold such that it comes into contact with at least a portion of the available surface of the tie layer. If desired, the overmolding conditions may be selected such that the tie layer/first substrate subassembly undergoes a change in shape during such overmolding (e.g., the subassembly may be thermoformed). Alternatively, the heated polymeric composition may be extrusion molded as a coating onto the tie layer surface to form the second substrate layer.

In yet another embodiment, a melt of the tie layer may be extruded between preformed sheets of the first and second substrate layers. This could be done just prior to lamination of the two sheets.

The tie layer may also be formed by applying a solution of the amorphous polyetherketoneketone to a substrate surface and then removing the solvent. Suitable solvents for amorphous polyetherketoneketones are known in the art and include, for example, halogenated hydrocarbons (particularly chlorinated hydrocarbons such as o-dichlorobenzene, 1,2,4-trichlorobenzene, methylene chloride and tetrachloroethylene), nitrobenzene, and aqueous mineral acids (e.g., sulfuric acid and/or nitric acid). The solvent may be removed from the coated substrate by any suitable method such as heating and/or application of vacuum.

Assemblies prepared in accordance with the present invention may be utilized in any of the end use applications where such laminates or composites conventionally are employed or have been proposed to be employed. Representative applications include composites and laminates (including two- and three dimensional panels and sheets) for aerospace/aircraft, automobiles and other vehicles, boats, machinery, heavy equipment, storage tanks, pipes, sports equipment, tools, biomedical devices (including devices to be implanted into the human body), building components, wind blades and the like. Benefits of the invention described herein include higher tensile strength, higher compressive strength, higher peel strength, enhanced solvent, chemical and water resistance, and improved resistance to delamination, as compared to assemblies prepared without tie layers based on amorphous polyetherketoneketone.

EXAMPLES

Example 1, Production of PEKK Film

A thin film of amorphous polyetherketoneketone A-PEKK (OXPEKK SP from Oxford Performance materials, T/I ratio of 60/40) was produced by melt processing pellets of A-PEKK on 1 inch Davis Standard extruder fitted with a 12 inch film die. The polymer was processed with a relatively low screw speed (20-80 RPM) and at 315-325° C. The extruder was fitted with a standard cast film take off stack from Davis standard operating at 150° C.

Films of crystalline grades, with T/I ratios of 70/30 or higher, are also possible but more difficult to produce. The rapid cooling and crystallization of these films requires higher extruder temperatures and melt temperatures (365-375° C.), and higher temperatures for the take off equipment (220-250° C. or higher).

Example 2, Production and Testing of Laminated Materials Using PEKK as the Tie Layer Test samples consisted of 1" by 5" metal or glass strips (see table 1) and 1" by 1" by 0.07" sheets of PEKK formed by the process described in Example 1. The surfaces of the test samples were cleaned with acetone to remove any grease or oil prior to molding. The samples were compression molded using a Carver press and two 12-inch by 12-inch aluminum blocks with small 1" by 5" indentations to hold the test samples. The press mold was preheated to 220-230° C. (for A-PEKK sheets) or 260-290° C. for crystalline PEKK. After preheating the mold was removed from the press and the test sheets and 1"×1" PEKK sheets carefully assembled into a 3 layer structure so as to not contaminate the bonding surfaces. The construction consisted of one PEKK sheet between two sheets of the appropriate tests materials. The mold was then reassembled and placed back in the press and reheated to the test temperature for c.a. 1 minute. The assemblies were then pressed at 2000 psi for 5 minutes and then removed and allowed to remain at room temperature for at least 24 hrs at 50% relative humidity prior to testing the strength of the bonding.

The strength of the bond was evaluated using a Zwick-Roell Z050 tensile testing in a instrument using a method similar to ASTM D3528-96 (2008) Standard Test Method For Strength Properties Of Double Lap Shear Adhesive Joints By Tension Loading with a cross head speed of 1.27 mm/min. The results are presented in Table 1 and Table 2 below.

TABLE 1

Lap shear tests of similar substrates using PEKK as an adhesive

| Substrate | Max Stress Avg (psi) | Max Stress Std Dev. | Break Stress Avg (psi) | Break Stress Std Dev | Failure Mode |
| --- | --- | --- | --- | --- | --- |
| Aluminum | 1491 | 97.17 | 1380 | 99.1 | cohesive |
| Steel | 2589 | 427.1 | 2590 | 427 | cohesive |
| Stainless Steel | 1779 | 319.4 | 1730 | 365 | cohesive |
| Galvanized Steel | 1046 | 628.4 | 1010 | 650 | cohesive |
| Anodized Aluminum | 1521 | 229.4 | 1520 | 229 | cohesive |
| Glass | N/A | N/A | N/A | N/A | substrate |
| Alclad Aluminum | 1684 | 280.8 | 1540 | 191 | cohesive |
| Zinc Dichromate | Samples broke during assembly, zinc coating delaminated | | | | |

TABLE 2

Lap shear tests of using PEKK as an adhesive for similar and dissimilar substrates

| Substrate | Max Stress Avg (psi) | Max Stress Std Dev. | Break Stress Avg (psi) | Break Stress Std Dev | Failure Mode |
| --- | --- | --- | --- | --- | --- |
| Aluminum-Aluminum | 1417 | 123.7 | 1320 | 143 | cohesive |
| AramidFilm Nomex-Aluminum | 146.9 | 12.64 | 142 | 16.5 | cohesive/substrate |
| AramidFilm Nomex-AramidFilm Nomex- | 108.8 | 10.84 | 114 | 4.79 | cohesive |
| AramidFilm Nomex - Steel | 140.5 | 8.9259 | 139 | 11.3 | cohesive |
| AramidFilm Nomex- Grit Blasted Steel | 144.2 | 15.92 | 138 | 12 | cohesive/substrate |
| Grit Blasted Steel-Aluminum | 1817 | 349.3 | 1820 | 349 | cohesive |

TABLE 2-continued

Lap shear tests of using PEKK as an adhesive for similar and dissimilar substrates

| Substrate | Max Stress Avg (psi) | Max Stress Std Dev. | Break Stress Avg (psi) | Break Stress Std Dev | Failure Mode |
|---|---|---|---|---|---|
| Grit Blasted Steel-Grit Blasted Steel | 2107 | 273.4 | 2110 | 273 | cohesive |
| Prepreg Tape - Grit Blasted Steel | 1116 | 191.1 | 498 | 190 | substrate |
| Grit Blasted Steel-Steel | 2217 | 579 | 2220 | 579 | cohesive |
| Aluminum-Prepreg Tape | 234 | 192.4 | 186 | 151 | adhesive/substrate |
| Prepreg Tape - Prepreg Tape | 1256 | 217.3 | 859 | 284 | substrate/adhesive |
| Prepreg Tape - Steel | 333.5 | 66.96 | 136 | 99.6 | substrate |
| Steel - Aluminum | 1250 | 226.4 | 1250 | 226 | cohesive/adhesive |
| Steel - Steel | 2811 | 223.4 | 2790 | 230 | cohesive |

Illustration of the Improved Adhesion that PEKK Provides Vs Other Similar High Temperature Polymers Polyether-ether-ketone is a polymer with a similar structure and use temperatures to PEKK, however it is produced with a pure para structure with no isophthalate (i.e. T/I=100). The microphotographs of the FIGURE illustrate that PEEK has much poorer adhesion to glass fibers as the fibers seem to pull away from the matrix when cryrofractured, while the microphotograph of the samples made with PEKK show that the fibers do not pull out and that PEKK is still attached to the fibers. As the FIGURE illustrates, the failure in the PEKK composite is cohesive as the failure is in the PEKK matrix. The fracture surface in this case shows significant ductility produced as a consequence of the effective load transfer between the fiber and the PEKK matrix. In contrast, the failure in the PEEK system is adhesive as the fibers are cleanly pulled from the matrix. The fractured surface shows a clean brittle rupture process, indicating that in this case the interaction of the fiber with the matrix is not as effective. Load transfer is not expected to be efficient in this system. The energy of breaking a piece by cohesive failure is dependant on the strength of the matrix itself and is generally regarded as higher than an adhesive failure.

What is claimed is:

1. A multilayer assembly comprising a first substrate, a second substrate and an adhesive, wherein a discontinuous adhesive layer consisting of amorphous polyetherketoneketone is positioned between and directly in contact with said first substrate and said second substrate, and wherein the amorphous polyetherketoneketone consists of repeating units represented by formulas I and II:

-A-C(=)—B—C(=O)—     I

-A-C(=O)-D-C(=O)—     II wherein A is a p,p'-Ph-O-Ph- group, Ph is a phenylene radical, B is p-phenylene, and D is m-phenylene and the isomer ratio of formula I:formula II (T:I) is 60:40 so as to provide amorphous polyetherketoneketone; wherein a contact surface of said first substrate is the same as or different from a contact surface of said second substrate and each of the contact surface of said first substrate and the contact surface of said second substrate is selected from the group consisting of glass, and prepreg tape.

2. The assembly of claim 1, wherein said discontinuous adhesive layer is from about 1 to about 100 microns thick.

3. The assembly of claim 1 which selected from the group consisting of a storage tank, a pipe, and a tube.

4. The assembly of claim 1 which selected from the group consisting of a sheet and a film.

5. A method of making an assembly, said method comprising joining a first substrate to a second substrate using a discontinuous adhesive layer consisting of amorphous polyetherketoneketone said amorphous polyetherketoneketone consisting of repeating units represented by formulas I and II:

-A-C(=O)—B—C(=O)—     I

-A-C(=O)-D-C(=O)—     II wherein A is a p,p'-Ph-O-Ph- group, Ph is a phenylene radical, B is p-phenylene, and D is m-phenylene and the isomer ratio of formula I:formula II (T:I) is 60:40 so as to provide amorphous polyetherketoneketone; wherein a contact surface of said first substrate is the same as or different from a contact surface of said second substrate and wherein each of the contact surface of said first substrate and the contact surface of said second substrate is selected from the group consisting of glass and prepreg tape, said method further comprising the step of positioning the discontinuous adhesive layer between said first and second substrates, whereby said discontinuous adhesive layer is directly in contact with a surface of said first substrate and directly in contact with a surface of said second substrate.

6. A multilayered laminated assembly comprising a first substrate, a second substrate, and a discontinuous adhesive layer, said discontinuous adhesive layer having first and second surfaces and positioned between said first substrate and said second substrate, the laminated assembly being configured such that the first substrate is directly attached to said first surface of the discontinuous adhesive layer, and the second substrate is directly attached to said second surface of the discontinuous adhesive layer, wherein said discontinuous adhesive layer is from about 1 to about 100 microns, and consists of amorphous polyetherketoneketone, wherein the amorphous polyetherketoneketone consists of repeating units represented by formulas I and II:

-A-C(=O)—B—C(=O)—     I

-A-C(=O)-D-C(=O)—     II wherein A is a p,p'-Ph-O-Ph- group, Ph is a phenylene radical, B is p-phenylene, and D is m-phenylene and the isomer ratio of formula I:formula II (T:I) is 60:40 so as to provide amorphous polyetherketoneketone; wherein a contact surface of said first substrate is selected from the group consisting of glass and prepreg tape, and wherein a contact surface of said second substrate is selected from the group consisting of glass, prepreg tape, and metals, wherein said assembly is laminated.

7. The multilayered laminated assembly of claim 6, which is selected from the group consisting of aircraft parts, automobile parts, boat parts, machinery parts, heavy equipment parts, storage tanks, pipes, sports equipment parts, tools, and biomedical device parts.

8. The multilayered laminated assembly of claim 6, wherein said assembly is laminated using sufficient heat and/or pressure, such that the desired degree of adhesion with the surface of the first and/or second substrate(s) is obtained.

* * * * *